3,372,043
SPRAY DRIED CLAY PRODUCT AND METHOD FOR PRODUCING THE SAME
John R. Fanselow, Plainfield, N.J., assignor, by mesne assignments, to Engelhard Minerals & Chemicals Corporation, Edison, N.J., a corporation of Delaware
No Drawing. Filed Feb. 21, 1966, Ser. No. 528,800
10 Claims. (Cl. 106—72)

ABSTRACT OF THE DISCLOSURE

A coarse size fraction of predispersed kaolin clay pigment for paper filler use is obtained by spray drying a dispersed aqueous slip of the kaolin clay in the presence of a small amount of added colloidal clay, preferably colloidal attapulgite clay. The spray dried microspheres are less fragile as a result of the presence of colloidal clay additive and maintain desirable flow properties during handling and use.

---

This invention relates to the spray drying of clay and is directed especially to the spray drying of kaolin clay that is composed of relatively large clay crystals.

Kaolin clays are frequently beneficiated or refined by processes in which aggregates of the clay are dispersed in water. For example, a widely practiced method for refining kaolin clay involves dispersing the clay in water in the presence of a clay deflocculating (dispersing) agent such as tetrasodium pyrophosphate, degritting the fluid dispersion by screening and then fractionating the dispersed clay slip into two or more size fractions by sedimentation. Usually the clay slip is cut at about 2 microns (equivalent spherical diameter or E.S.D.) since it is generally believed by those skilled in the art that kaolin platelets finer than about 2 microns are substantially different in properties, especially optical properties, from the plus 2 micron kaolin particles.

Spray drying is usually the most economical method for drying wet-processed dispersed clay slips. This method for drying the clay results in the formulation of small spheres, usually called "microspheres." The microspheres are composed of a multiplicity of micron-size clay particles which are coated with a small amount of the dispersant. The presence of the dispersant with the clay is especially desirable when the microspheres are used for applications in which the clay must be reslurried and redispersed. Dry clays that are mixed or coated with dispersants are usually called "predispersed clays."

One of the principal advantages of drying wet-processed kaolin clay by spray drying is that the kaolin microspheres are free-flowing and are much easier to handle than powdered kaolin clay would be. Powdered kaolin clay normally has an angle of repose of about 90° and, therefore, the powdered clay resists flow through chutes and hoppers unless vibrators or air lancers are used. Microspheres, in contrast, normally assume an angle of repose of about 45° and flow readily in hoppers and chutes without vibrators or lancers. Since the mechanical breakdown of the microspheres would result in the loss of free-flowing properties, it is apparent that spray dried kaolin microspheres should have sufficient mechanical strength to resist substantial mechanical breakdown during the usual handling and shipping. Further, the presence of dust creates problems in material handling that is avoided by the use of coherent microspheres.

One of the principal users of refined kaolin clays is the paper industry. When used for paper coating or filling purposes, dry clay, preferably predispersed clay, is reslurried in water and the system agitated until the clay aggregates break down and the individual clay crystals are dispersed in the water. This operation, referred to as the "makedown," must be carried out with a modest power expenditure. It is obvious that predispersed clay microspheres for the paper industry cannot be hardened by methods or means which would impair the ease with which the clay is redispersed in water. Therefore, the need to provide mechanically strong microspheres which resist powdering or crumbling when subjected to attrition or impact when dry, must be counterbalanced by the need to provide the clay in the form of particles which readily crumble and disintegrate when agitated in water. The nature of the bond in the microspheres is therefore basically different from the nature of bond in other clay aggregates, such as catalyst carriers, active contact masses and agricultural carriers which must retain their agglomerate form during use. High temperature bonding procedures which sinter or fuse the clay cannot be used in producing spray dried predispersed kaolin microspheres for the paper coating industry. Moreover, since common clay dispersants (condensed phosphates) are deactivated by microbial action, organic bonding material should be avoided. Similarly, material which will impair the whiteness or brightness of the clay cannot be present.

Kaolin clays containing a substantial quantity of minus 2 micron particles are especially amenable to drying by means of spray dryers. The fine paper coating grades of kaolin which contain 80 percent or more of minus 2 micron (E.S.D.) particles and have an average particle size of about 0.5 to 0.8 microns (E.S.D.) are successfully produced as predispersed spray dried products. When these clays are spray dried, they form coherent microspheres which do not break down appreciably during the usual handling but which readily disperse when agitated in water. However, kaolin that contains a relatively large proportion of plus 2 micron particles, exemplified by paper-filling grades of kaolin having an average particle size of 3 to 5 microns, is not suitable as feed material for spray dryers. When these relatively coarse clays are spray dried, fragile microspheres are produced. These microspheres readily break down into a powder which creates a dust problem and is difficult to unload and handle. Prior to my invention or discovery, coarse degritted kaolins were not available as coherent spray dried predispersed microspheres in spite of the longfelt need for predispersed microspheres of such quality.

Accordingly, an object of this invention is to provide an improved method for spray drying relatively coarse kaolin clay.

Another object is the provision of water-dispersible, free-flowing spray dried microspheres of coarse particle size kaolin crystals, which microspheres have reduced friability or fragility and maintain their desirable flow properties during normal handling.

A specific object is to improve the mechanical stability of spray dried predispersed microspheres of coarse kaolin without impairing the dispersion properties of the clay and without introducing deleterious foreign matter therein.

I have discovered a simple but highly effective method for producing spray dried, free-flowing microspheres of dispersant-coated coarse kaolin clay which results in the production of predispersed microspheres which are coherent and resist breakdown in dry condition but which are readily dispersed in water when agitated therein.

Briefly stated, in accordance with this invention, a small amount of colloidal clay crystals selected from the group consisting of colloidal attapulgite, colloidal sepiolite, colloidal montmorillonite and mixtures thereof is incorporated into a fluid deflocculated aqueous dispersion of minus 44 micron coarse kaolin clay containing at least 50 percent by weight of plus 2 micron (E.S.D.) particles.

The mixture is agitated until the colloidal clay is uniformly dispersed in the liquid, and the aqueous mixture of dispersed clays is then spray dried at a temperature at which physically held water is eliminated from the clays. This results in dry coherent microspheres composed of an intimate mixture of kaolin clay including a substantial amount of plus 2 micron kaolin crystals, a small amount of dispersant and a small amount of colloidal clay additive. These microspheres maintain substantially their original form and free-flowing properties during usual shipping and loading and they have reduced tendency to disintegrate into powdered fines or dust when agitated in dry state or condition as compared with spray dried microspheres produced from similar coarse kaolin clay in the absence of the colloidal clay additive. However, the microspheres are readily dispersible in aqueous media into the ultimate micro-size clay particles since the colloidal clay additive does not bind the kaolin aggregates with sufficient strength to form a bond which reduces the ease with which the microspheres disperse in water. Thus, the microspheres are coherent in dry condition but not when agitated in water.

The term "colloidal clay" as used herein refers to a metallo-aluminum silicate which disperses into ultimate particles having an average particle size less than ½ micron, as determined by centrifugal sedimentation.

The colloidal clays employed in practice of this invention are fundamentally different in characteristics from the kaolin clay crystals which constitute the predominating constituent of the microspheres. Thus, when the kaolin clay used in practice of this invention is agitated in water without a dispersant at 10 percent to 20 percent concentration, a fluid slip is produced. In marked contrast, when any of colloidal attapulgite, sepiolite or montmorillonite is subjected to similar treatment, semisolid gels or pastes are produced. The colloidal clays are also fundamentally different in morphology from the kaolin in the microspheres. Attapulgite, which is the preferred colloidal clay from the standpoint of availability, is composed of long, needlelike (acicular) crystals. Kaolinite particles are platey hexagonal crystals. Colloidal attapulgite clay and its properties are described in U.S. 3,050,863 to Aldo P. Allegrini et al. Sepiolite clay, which is also an acicular clay, is similar in composition and nature to attapulgite and is frequently considered to be an equivalent of attapulgite clay. The mineral sepiolite is described in Grim's "Clay Mineralogy," McGraw-Hill Book Company, Inc. (1953). The latter text also describes the composition and characteristic of minerals of the montmorillonite family which includes hectorite and sodium montmorillonite. The latter is the principal mineral constituent of Wyoming bentonite. The use of colloidal crystalline clay which is substantially free from abrasive and plus 325 mesh materials is strongly preferred. Fluid energy ground colloidal clay which is free from ultimate particles larger than 325 mesh is suitable for nonpaper uses, such as paints. For paper uses hydraulically degritted colloidal clay is preferable.

Representative kaolin clays to which this invention is applicable have a particle size distribution within the following range:

| Percent by weight coarser than: | Microns (E.S.D.) |
| --- | --- |
| 0 | 44 |
| 5–20 | 10 |
| 20–50 | 5 |
| 50–100 | 2 |

The invention is of especial benefit in the processing of comparatively coarse grades of paper filler kaolin clays containing 0 percent plus 44 microns and about 60 percent to 70 percent of plus 2.0 micron particles. (The term kaolin clay encompasses clays composed of a predominating amount of any of the following mineral species: kaolinite, anauxite, dickite and nacrite.)

Generally speaking, the clays that are benefited by practice of this invention are appreciably coarser than the clay in known deposits of kaolin clay since degritted whole kaolin clays usually have an average particle size within the range of ½ to 2 microns. The coarse clays used in the practice of this invention can be obtained by degritting sedimentary or primary clay crudes, fractionating the degritted clay slurries in centrifugal sizers, and bleaching, thickening and filtering the coarse size fraction (or mixture of fractions) from the sizers. The clays may also undergo beneficiation by other methods, such as flotation. The clay filter cakes, which contain less than 70 percent solids, can be fluidized at least to a pumpable consistency by addition of an aqueous solution of a clay deflocculating agent. The water content of the treated filter cake is preferably limited, as described in U.S. 2,540,182 to Charles Gerald Albert, when it is desirable to prepare high solids sprayable clay slips. The deflocculating agents enumerated in said patent to Albert can be employed to deflocculate the clay slurry. Condensed phosphates, illustrated by tetrasodium pyrophosphate, sodium hexametaphosphate and sodium tripolyphosphate, are the preferred deflocculating agents, especially when employed with sodium hydroxide to adjust the pH of the slips to a value within the range of 7 to 9. Condensed phosphate dispersants are employed in amount within the range of 0.1 percent to 0.5 percent of the weight of the clay. Small amounts of dispersant stabilizers, sequestering agents, fungicides, etc., can be incorporated into the slips provided such additives do not impair the colloidal properties of the clay or introduce constituents which will make the microspheres subject to microbial attack during storage.

The colloidal clay can be incorporated into the fluidized filter cake in the form of dry finely divided particles or the colloidal clay can be dispersed in water and the dispersion added to the fluidized kaolin filter cake. In the latter case, a condensed phosphate and/or sodium sillicate can be used to disperse the colloidal clay in the water. An essential characteristic or feature of the process of the invention is that the colloidal clay additive is in dispersed or defluocculated condition when it is charged to the spray dryer. Therefore, individual colloidal clay crystals, as opposed to aggregates or agglomerates, must be present in the slip of dispersed kaolin which is charged to the spray dryers. In order to disperse the colloidal clay in the kaolin slip, the slip must undergo agitation after addition of the colloidal clay. The mere addition of the colloidal clay to the kaolin slip will not suffice. The amount of shear that is required to disperse the colloidal clay will be greater in the case of attapulgite and sepiolite than when a swelling bentonite is employed.

Commercial kaolin clays adapted for paper coating use are frequently worked at high solids in order to reduce the viscosity of the clay. With kaolins that undergo such processing, the colloidal clay can be added to the fluidized filter cake before the cake is worked at high solids. When the clay is worked by a technique such as pugging which requires the use of very high clay solids, supplementary dry kaolin must be incorporated with the fluidized cake to bring the solids to a suitable level.

If necessary, the mixture of colloidal clay, kaolin, dispersant and water is adjusted by the addition of water to a kaolin content of about 58 percent to about 65 percent by weight before spray drying. The slip is then sprayed into an atmosphere of hot inert gases. This causes water to evaporate almost instantaneously from droplets of the slurry and produces small spheres. Apparently, when the slurry is spray dried the colloidal clay crystals orient themselves relative to the larger kaolinite platelets in a manner such as to strengthen the attractive forces between the dry platelets without fusing or permanently interlocking the platelets. This would account for the fact that the clay must be dispersed along with the kaolin before the kaolin is spray dried.

Spray dryers of various designs can be used. These dryers may be of the cocurrent, countercurrent or mixed flow type. Nozzles, disk or the like can be used to disperse the slurry into droplets. The temperature of the inlet and outlet air in the spray dryer will depend, of course, on the design of the dryer. The temperature of the microspheres in the dryer chamber should be below 225° F., e.g., 180° F. to 200° F., to prevent sintering or fusion. At these temperatures, free moisture is eliminated from the clays without removing water of hydration (water of crystalization.) Using a cocurrent dryer, air inlet temperatures of about 1000° F. to 1200° F. are suggested when the clay feed is charged at a rate sufficient to produce an air outlet temperature within the range of about 250° F. to 300° F. Normally, the size of the microspheres is immaterial. Since the microspheres are pulverulent, it is not practical to determine their size by conventional methods such as screening. Visual inspection of representative samples of spray dried predispersed kaolin clay products indicates that the microspheres are usually finer that 100 mesh and contain a substantial quantity (e.g., as much as 50 percent by weight) of minus 325 mesh particles.

The specific amount of colloidal clay employed with the coarse kaolin is not critical and good results are realized over a fairly wide range of colloidal clay addition. In most cases the quantity of colloidal clay is within the range of ½ percent to 5 percent of the moisture free weight of the kaolin, calculated on basis of colloidal clay containing 25 percent volatile matter. (The quantity of colloidal clay is conveniently calculated on the basis of clay containing water because certain colloidal clays, especially attapulgite, are very hygroscopic.) Commercial grades of refined colloidal attapulgite frequently have a volatile matter content of 25 percent. Therefore, calculations based on the weight of clay containing 25 percent volatile matter have a practical basis. The use of 1.25 pounds of attapulgite clay, 25 percent volatile matter basis, per 100 pounds of dry kaolin corresponds to the use of 1.00 pounds of volatile-free attapulgite per 100 pounds of dry kaolin. When employed in amount less than ½ percent of the kaolin weight, the improvement in strength of the microspheres may not be adequate. When used in amount substantially in excess of 5 percent, the clay product may be undesirably discolored and/or the viscosity of aqueous dispersions the kaolin clay may be excessive before and/or after spray drying. The preferred quantity of colloidal clay is usually within the range of 1 percent to 3 percent of the weight of the kaolin. Little, if any, benefit is realized in terms of improved microsphere strength by using more than 3 percent colloidal clay additive. It will be apparent to those skilled in the art that even with the addition of as much as 5 percent colloidal clay to the coarse kaolin, the average particle size of the ultimate clay particles in the microspheres is still appreciably greater than the average particle size of the clay in prior art predispersed microspheres of fine size paper coating kaolins which contain 25 percent or more of minus ½ micron clay particles. Therefore, the desirable results that are realized by addition of colloidal clay cannot be explained on the basis that the overall particle size of the coarse clay is adjusted to a size comparable to that of the fine kaolin which is especially amenable to spray drying.

In a pilot plant operating in accordance with the process of this invention, various quantities of colloidal attapulgite clay were dispersed in aqueous slips of a commercial relatively coarse size fraction of Georgia paper filler kaolin. The slips were then spray dried in a cocurrent air spray dryer of the type useful in producing predispersed kaolin microspheres for paper coating use. The spray dried products, which were especially adapted for use in filling paper, were evaluated and compared with each other and with control predispersed microspheres in which no colloidal clay was added to the dispersed slip of coarse kaolin. The details are as follows.

The kaolin that was used was a chemically bleached clay from a mine near McIntyre, Ga. and had been processed by degritting, centrifugal sizing and blending of fractions. The clay had an average particle size of 3.5 microns. Following is a particle size distribution of the clay, as determined from a particle size distribution curve of representative plant production.

*Particle size of coarse fractionated kaolin clay*

| Wt. percent finer than: | Microns, E.S.D. |
|---|---|
| 100 | 20 |
| 86 | 10 |
| 70 | 6 |
| 55 | 4 |
| 35 | 2 |
| 20 | 1 |
| 15 | ½ |

The colloidal attapulgite clay that was employed was "Attagel 20," which is the trade name of a fluid energy ground attapulgite clay product from a mine near Attapulgus, Ga. This clay has a free moisture content of 12 percent (as produced) and a volatile matter content of 22 percent (as produced). The clay had a 325 mesh residue of 0.3 percent by weight. A particle size distribution chart of representative commercial production of this clay indicates that it contains 90 percent by weight of particles finer than 2.0 microns; 70 percent minus 0.50 micron and 50 percent minus 0.14 micron.

A 63±2 percent kaolin dispersion (63±2 pounds kaolin and 27±2 pounds water) was prepared by dissolving tetrasodium pyrophosphate in water, adding the kaolin to the solution and agitating thoroughly with a paddle-type agitator. The tetrasodium pyrophosphate was used in amount of 0.3 percent of the moisture-free weight of the kaolin. The "Attagel 20" was added to portions of the resulting slip, using 1.3, 2.5 and 5.0 pounds of the "Attagel 20" (as is clay weight) for each 100 pounds of dry kaolin clay in the slip. The slip was thoroughly agitated with a paddle-type agitator to disperse the attapulgite.

The slurries were spray dried in a cocurrent spray dryer using an air inlet temperature of 1000° F. to 1100° F. and an air outlet temperature of 250° F. to 300° F. A cyclone elutriated fines from the chamber of the dryer. These fines represented about 15 percent by weight of the product. The chamber product was discharged at a temperature less than 200° F. and contained less than ½ percent free moisture.

The products from the dryer chamber were examined for appearance, relative friability of microspheres, angle of repose and flow characteristics. Also tested were product brightness and ease of redispersing the microspheres in water.

Photomicrographs of the products showed that chamber products containing attapulgite clay crystals were composed of a larger proportion of particles in the form of microspheres than the chamber product that did not contain the attapulgite additive. Product brightness of the control microspheres (G.E. method) was 84.0 percent, as compared to 83.0, 82.5 and 82.7 percent for products containing 1.3 percent, 2.5 percent and 5.0 percent "Attagel 20." These results indicate that brightness was virtually unimpaired by addition of the "Attagel 20." The bulk densities of the chamber products were in the range of 44 to 45 pounds per cubic foot, indicating that the "Attagel 20" did not make the microspheres undesirably heavy and compact.

All of the products dispersed with comparable ease when agitated in water without addition of dispersant.

Friability of the microspheres and the correlated flow characteristics were tested as follows. One hundred gram samples of microspheres from the spray dryer chamber were placed in a laboratory funnel (about 4 inch diameter with a ¼ inch diameter stem) and the time required for the microspheres to flow out of the funnel was measured.

Also measured was the approximate angle of repose of the dry clay above the throat of the funnel. Other samples of the microspheres were then shaken vigorously for 30 seconds in a half-filled jar by an action similar to the action of a "paint shaker." The time required for 100 grams of the latter samples to flow through the stem of the funnel was determined. The procedure was repeated with different samples of the microspheres and increasing the shaking time to 120 seconds. The most significant results are recorded in the following table.

EFFECT OF PRESENCE OF COLLOIDAL ATTAPULGITE ON THE FRAGILITY AND FLOW PROPERTIES OF PRE-DISPERSED MICROSPHERES OF SPRAY DRIED COARSE KAOLINITE

| Composition of Microspheres, g. Colloidal Attapulgite Added per 100 g. Kaolin | Angle of Repose of Microspheres | Time (seconds) Required For Microspheres to Flow Through Funnel | | |
|---|---|---|---|---|
| | | Fresh Microspheres | After Shaking | |
| | | | ½ min. | 2 min. |
| 0 | 85°±5° | 245 | Would not flow | |
| 1.3 | 45°±1° | 105 | 200 | 220 |
| 2.5 | 45°±1° | 56 | 95 | 120 |
| 5.0 | 45°±1° | 60 | 100 | 115 |

Data in the table show that the angle of repose of the predispersed spray dried microspheres was approximately 90° when attapulgite was absent and that all products containing the attapulgite additive had an angle of repose very close to 45° until they had been shaken in the jar. The product with the 5.0 percent "Attagel 20" retained an angle of repose of close to 45° even after the two minutes of shaking. (The product with 2.5 percent "Attagel 20" did not perceptibly change its angle of repose with ½ minute of shaking, but the angle of repose increased perceptibly to about 60° with the two minutes shaking. The product containing 1.3 percent "Attagel 20" showed a small change in angle of repose with ½ minute shaking and developed an angle of repose close to 90° with the two minutes of intense shaking.) Data in the table show also that the control product "arched" and would not flow after ½ minute of shaking. In contrast, the products containing attapulgite additive were still free-flowing after two minutes of shaking. In fact, after two minutes of shaking, the attapulgite-treated microspheres were more free-flowing than the control microspheres were without being shaken.

The data therefore indicate that the presence of the "Attagel 20" in amount of 1.3 to 5.0 percent of the weight of the kaolin reduced the friability of predispersed microspheres of coarse clay and that the colloidal attapulgite-treated microspheres maintained free-flowing properties after being subjected to conditions which resulted in the pulverization of microspheres of the coarse clay that did not contain the colloidal clay additive.

In a commercial scale operation of the process, a filter cake of the 3½ micron Georgia kaolin clay was fluidized by addition of tetrasodium pyrophosphate. To this dispersion was added a fluid 20 percent aqueous dispersion of degritted colloidal attapulgite. The dispersion of the colloidal clay had been prepared by agitating raw Georgia-Florida fullers earth in an aqueous solution of tetrasodium pyrophosphate adjusted to a pH of 10 by addition of sodium hydroxide, and then screening and centrifuging the dispersion to produce a degritted slip of the clay. The attapulgite dispersion was added in amount to incorporate 2½ pounds of attapulgite (25 percent volatile matter basis) per 100 pounds of moisture-free kaolin. The ingredients were thoroughly mixed and the slip, which contained coarse kaolin, colloidal attapulgite, tetrasodium pyrophosphate, sodium hydroxide and water, was spray dried under conditions similar to those used in the pilot plant operation. The spray dried predispersed microspheres were loaded by chutes into hopper-bottomed freight cars and shipped by rail for a distance of about 1000 miles. The product, unlike predispersed microspheres of the coarse clay without the attapulgite clay additive, was still free-flowing after transit and could be unloaded and conveyed.

The term "free moisture" as used herein refers to the weight percentage of a material eliminated when the material is heated to constant weight at 225° F. Volatile matter refers to the weight percentage of a material eliminated when a material is heated to essentially constant weight at 1800° F. All mesh sizes refer to values obtained with Tyler sieves. All particle size of clay refers to the size of the ultimate clay particles and is reported as microns (E.S.D.) as determined by the sedimentation procedure described in Tappi Standards, T649 SM–54; particle size data in ranges below 0.5 micron is determined by a simple modification of the Tappi method, which provides for the use of a long arm centrifuge as described in a publication by F. H. Norton and S. Speil in J. Am. Ceramic Soc., 21, 89 (1938).

I claim:

1. Small coherent spherical aggregates comprising a spray dried mixture of minus 44 micron kaolin clay having an average particle size in excess of 2 microns, a small amount of a clay dispersant and a small amount of a colloidal clay selected from the group consisting of colloidal attapulgite, colloidal sepiolite, colloidal montmorillonite and mixtures thereof, the quantity of said colloidal clay being such that said aggregates are more resistant to mechanical breakdown by shaking when dry than similar aggregates in the absence of said colloidal clay and said aggregates are dispersible in water with substantially the same ease as similar aggregates in the absence of said colloidal clay.

2. Spray dried coherent microspheres composed of a uniform mixture of degritted Georgia kaolin clay having an average particle size within the range of 3 to 5 microns, a condensed phosphate dispersant in amount within the range of 0.1 percent to 0.5 percent of the weight of said clay, and degritted colloidal attapulgite clay crystals in amount within the range of about ½ percent to 5 percent of the dry weight of the kaolin clay, calculated on the basis of the weight of attapulgite clay having a volatile matter content of 25 percent.

3. The microspheres of claim 2 in which said kaolin clay contains 60 percent to 70 percent by weight of particles larger than 2.0 microns.

4. The microspheres of claim 3 which, when pulverized, have a brightness comparable to that of the kaolin in the absence of said colloidal clay.

5. The microspheres of claim 2 in which said kaolin clay has a particle size distribution substantially as follows:

| Wt. percent finer than: | Microns, E.S.D. |
|---|---|
| 100 | 20 |
| 86 | 10 |
| 70 | 6 |
| 55 | 4 |
| 35 | 2 |
| 20 | 1 |
| 15 | ½ |

6. The microspheres of claim 2 wherein said colloidal attapulgite clay crystals are present in amount within the range of about 1 percent to 3 percent of the dry weight of the kaolin clay, calculated on the basis of the weight of attapulgite clay having a volatile matter content of 25 percent.

7. A method for processing coarse kaolin clay containing a substantial amount of particles larger than 2 microns which comprises: agitating a small amount of a colloidal clay selected from the group consisting of colloidal attapulgite, colloidal sepiolite, colloidal montmorillonite and mixtures thereof with water, a clay dispersant and said coarse kaolin clay, using sufficient agitation to disperse said clays in said water, and spraying the dispersion into hot air at a temperature at which free moisture is eliminated without removing water of hydration from the kaolin, thereby producing microspheres, the quantity of said colloidal clay being sufficient to produce microspheres which are less fragile than microspheres that would be produced from said kaolin clay by spray drying in the absence of said colloidal clay.

8. The method of claim 7 in which said clay is colloidal attapulgite employed in amount within the range of ½ percent to 5 percent of the weight of the kaolin, calculated on the weight of attapulgite containing 25 percent volatile matter.

9. The method of claim 7 in which said dispersion is sprayed under conditions such that the air contacting the microspheres is at a temperature within the range of from about 1000° F. to 1200° F. and the microspheres in the chamber of the spray dryer have a temperature below 200° F.

10. A method for preparing a predispersed coarse kaolin product in the form of coherent microspheres which comprises:

forming a fluid, sprayable mixture comprising water, a small amount of a condensed phosphate clay dispersant, dispersed coarse kaolin clay containing a substantial amount of particles larger than 2 microns and dispersed colloidal clay in amount within the range of from ½ percent to 5 percent of the weight of the kaolin, calculated on the weight of colloidal clay containing 25 percent by weight volatile matter, said colloidal clay being selected from the group consisting of colloidal attapulgite, colloidal sepiolite, colloidal montmorillonite and mixtures thereof, and spraying said fluid mixture into hot air at a temperature at which free moisture is eliminated without removing water of hydration from said kaolin clay, thereby producing coherent microspheres.

References Cited
UNITED STATES PATENTS

| | | | |
|---|---|---|---|
| 2,366,047 | 12/1944 | Nerlinger | 106—308 |
| 2,950,983 | 8/1960 | Rowland | 106—309 |

TOBIAS E. LEVOW, *Primary Examiner.*

JAMES E. POER, *Examiner.*